United States Patent
Nagashima

(10) Patent No.: US 11,230,488 B2
(45) Date of Patent: Jan. 25, 2022

(54) APPARATUS FOR MANUFACTURING POROUS GLASS SOOT BODY

(71) Applicant: Shin-Etsu Chemical Co., Ltd., Tokyo (JP)

(72) Inventor: Yoshinobu Nagashima, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 122 days.

(21) Appl. No.: 16/684,559

(22) Filed: Nov. 14, 2019

(65) Prior Publication Data

US 2020/0156988 A1 May 21, 2020

(30) Foreign Application Priority Data

Nov. 20, 2018 (JP) .............................. JP2018-216955

(51) Int. Cl.
*C03B 37/014* (2006.01)
(52) U.S. Cl.
CPC ...... *C03B 37/0142* (2013.01); *C03B 2207/42* (2013.01)
(58) Field of Classification Search
None
See application file for complete search history.

(56) References Cited

U.S. PATENT DOCUMENTS

| | | | |
|---|---|---|---|
| 10,377,659 B2 | 8/2019 | Terashima | |
| 2006/0130524 A1* | 6/2006 | Hovinen | C03B 37/029 65/32.5 |
| 2007/0248755 A1 | 10/2007 | Yoshida | |
| 2013/0025326 A1* | 1/2013 | Dabby | C03B 37/01446 65/422 |
| 2019/0112218 A1* | 4/2019 | Otosaka | C03B 37/01815 |

FOREIGN PATENT DOCUMENTS

| | | | | |
|---|---|---|---|---|
| JP | 357167734 U | 10/1982 | | |
| JP | 358204833 A | 11/1983 | | |
| JP | H0986948 A | 3/1997 | | |
| JP | 09188523 A | * 7/1997 | ....... | C03B 37/01406 |

(Continued)

OTHER PUBLICATIONS

JP 2014009142 machine translation, Suzuki, Tomoya; Manufacturing Method of Glass Fine Particle Deposit and Manufacturing Device; Jan. 2014 (Year: 2014).*

(Continued)

*Primary Examiner* — Queenie S Dehghan

(57) ABSTRACT

An apparatus for manufacturing a porous glass soot body to be formed into an optical fiber preform includes: a reaction chamber; a burner to form the porous glass soot body by depositing glass particles onto a seed rod hung inside the reaction chamber; and a heat-blocking element filling a gap between the burner and an opening for inserting the burner into the reaction chamber. A purpose is to prevent damage to the burner in the apparatus for manufacturing a porous glass soot body. In the manufacturing apparatus, the heat-blocking element may include a fibriform material. Also, in the manufacturing apparatus, the heat-blocking element may include a quartz wool material. Further, in the manufacturing apparatus, the content of iron in the quartz wool material may be 1 ppm or less.

10 Claims, 2 Drawing Sheets

(56) References Cited

FOREIGN PATENT DOCUMENTS

| JP | 2006508884 A |   | 3/2006  |        |            |
|----|--------------|---|---------|--------|------------|
| JP | 2006096642 A |   | 4/2006  |        |            |
| JP | 2009107874 A |   | 5/2009  |        |            |
| JP | 2013234078 A |   | 11/2013 |        |            |
| JP | 2014009142 A | * | 1/2014  | ....... | C03B 37/01208 |
| JP | 2014122127 A | * | 7/2014  |        |            |
| JP | 2016117616 A |   | 6/2016  |        |            |
| JP | 2018177611 A |   | 11/2018 |        |            |

OTHER PUBLICATIONS

JP 09188523 machine translation; Kawaguchi, Sakae et al.; Production of Silica Glass and Device for Producing the same; Jul. 1997 (Year: 1997).*

JP 2014122127 machine translation; Horikoshi Hideharu; High Purity Quartz Glass Wool, and Method for Producing the same; Jul. 2014 (Year: 2014).*

Office Action issued for counterpart Japanese Application No. 2018-216955, issued by the Japan Patent Office dated Oct. 13, 2021 (drafted on Oct. 8, 2021).

* cited by examiner

APPARATUS FOR MANUFACTURING POROUS GLASS SOOT BODY

The contents of the following Japanese patent application are incorporated herein by reference;
  Japanese Patent Application No. 2018-216955 filed on Nov. 20, 2018.

BACKGROUND

1. Technical Field

The present invention relates to an apparatus for manufacturing a porous glass soot body for optical fibers.

2. Related Art

One method for manufacturing a porous glass soot body in the process of manufacturing an optical fiber preform is the Vapor-phase Axial Deposition (VAD) method, in which a plurality of synthesizing burners are used to concurrently form a core-corresponding portion and a clad-corresponding portion of a porous glass soot body for optical fibers (see Patent Document 1). A known apparatus for manufacturing a porous glass soot body for optical fibers includes a ring-shaped glass plate near the synthesizing burner to block the heat generated in the reaction chamber (see Patent Document 2).
Patent Document 1: Japanese Patent Application Publication No. 2013-234078
Patent Document 2: Japanese Patent Application Publication No. 2006-096642
According to the manufacturing apparatus disclosed in Patent Document 2, the stress on the heat-blocking plate may affect the burner, causing damage to the burner.

SUMMARY

According to an aspect of the present invention, an apparatus for manufacturing a porous glass soot body to be formed into an optical fiber preform is provided, the apparatus including: a reaction chamber; a burner to form the porous glass soot body by depositing glass particles onto a seed rod hung inside the reaction chamber; and a heat-blocking element, filling a gap between the burner and an opening for inserting the burner into the reaction chamber, to block heat between the inside and outside of the reaction chamber.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
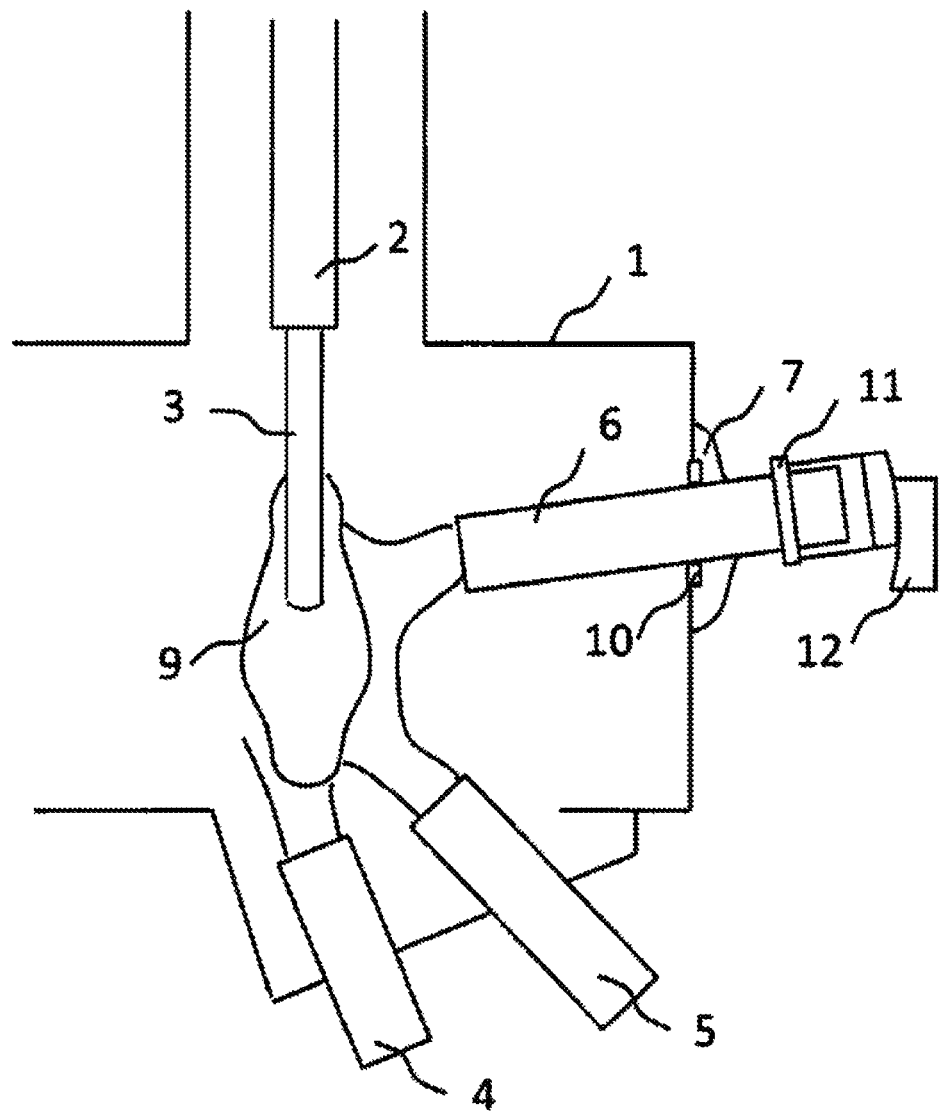
FIG. 1 shows a schematic view of an apparatus for manufacturing a porous glass soot body according to example embodiment 1.

FIG. 1 schematically shows the structure of an apparatus for manufacturing a porous glass soot body according to an example embodiment. As shown in FIG. 1, the manufacturing apparatus includes a reaction chamber 1, a shaft 2, and a plurality burners. The apparatus for manufacturing a porous glass soot body is to manufacture a porous glass soot body 9 inside the reaction chamber 1.

The shaft 2, holding a seed rod 3 at its lower end in the figure, is inserted into the reaction chamber 1 from above. The seed rod 3 is thus hung inside the reaction chamber 1. The seed rod 3 serves as a target onto which glass particles are adhered for growing the porous glass soot body.

The shaft 2 is provided to be able to rotate around a vertical rotation axis and move up and down together with the seed rod 3 while hanging the seed rod 3. In this manner, the seed rod 3 can be pulled up as the porous glass soot body 9 grows, to manufacture the porous glass soot body 9 with a targeted length.

In the porous glass soot body 9, a core-corresponding portion, which will form a core of an optical fiber, is formed at a central portion of the soot body positioned below the seed rod 3. A clad-corresponding portion, which will eventually form a clad of an optical fiber, is formed at an outer peripheral portion of the porous glass soot body 9. Since the clad-corresponding portion has a significantly larger volume than the core-corresponding portion, the clad-corresponding portion may be formed by using a plurality of clad-corresponding portion synthesizing burners. In the illustrated example, a single core-corresponding portion depositing burner 4 is provided while a core-side clad-corresponding portion depositing burner 5 and a surface-side clad-corresponding portion depositing burner 6 are provided.

Raw material gas containing silicon tetrachloride, octamethylcyclotetrasiloxane and the like, which are used as raw materials of glass, is fed into each of the core-corresponding portion depositing burner 4, core-side clad-corresponding portion depositing burner 5 and surface-side clad-corresponding portion depositing burner 6. The raw material gas is blown into oxyhydrogen flame through each burner, to synthesize glass particles to be deposited as the porous glass soot body 9.

The core-corresponding portion depositing burner 4 is used to deposit the synthesized glass particles mainly onto the end of the seed rod 3 and the core-corresponding portion growing downward from the end of the seed rod 3. The core-corresponding portion of the porous glass soot body 9 is formed of glass particles having a relatively high refractive index. For this purpose, dopants for increasing the refractive index are fed together from the core-corresponding portion depositing burner 4. For example, in the core-corresponding portion depositing burner 4, germanium tetrachloride and the like are added to the raw material gas as raw materials of germanium oxide, which serves as the dopants.

The core-side clad-corresponding portion depositing burner 5 is used to deposit the synthesized glass particles mainly onto the peripheral surface of the core-corresponding portion, which is formed by depositing glass particles using the core-corresponding portion depositing burner 4. The surface-side clad-corresponding portion depositing burner 6 is further used to deposit the synthesized glass particles mainly onto a part of the clad-corresponding portion, which is deposited by using the core-side clad-corresponding portion depositing burner 5.

The core-side clad-corresponding portion depositing burner 5 is used to form an inner part of the clad-corresponding portion adjacent to the core-corresponding portion. The surface-side clad-corresponding portion depositing burner 6 is arranged adjacent to the core-side clad-corresponding portion depositing burner, and is used to form a surface-side part of the clad-corresponding portion. The part of the clad-corresponding portion formed by using the core-side clad-corresponding portion depositing burner and the part of the clad-corresponding portion formed by using the surface-side clad-corresponding portion depositing burner 6 are formed into an integrated clad-corresponding portion in the completed porous glass soot body.

The core-side clad-corresponding portion depositing burner 5 and the surface-side clad-corresponding portion depositing burner 6 are fed with silicon tetrachloride as a glass raw material, hydrogen gas as a combustible gas, oxygen gas as a combustion-supporting gas, argon gas as a seal gas, and the like, with no addition of dopants for changing the refractive index. For the purpose of adjusting the refractive index of the clad-corresponding portion, germanium tetrachloride gas, silicon tetrafluoride gas, and the like may be added to the above-mentioned gases.

The apparatus for manufacturing a porous glass soot body further includes a burner holder 11 and an electric goniometer stage 12. The burner holder 11 holds a part of the surface-side clad-corresponding portion depositing burner 6 near its rear end and is supported on the electric goniometer stage 12.

The electric goniometer stage 12 operates in accordance with the deposition time or the pull-up distance of the shaft 2 to change the tilt of the surface-side clad-corresponding portion depositing burner 6. This enables automatic control of the tilt of the surface-side clad-corresponding portion depositing burner 6.

The surface-side clad-corresponding portion depositing burner 6 rotates around an imaginary rotation axis defined by the electric goniometer stage 12, to change the tilt of the burner. By arranging the imaginary rotation axis of the electric goniometer stage 12 closer to an opening in the reaction chamber 1 through which the surface-side clad-corresponding portion depositing burner 6 is inserted, the displacement of the surface-side clad-corresponding portion depositing burner 6 in the opening can be reduced, which occurs when the tilt of the surface-side clad-corresponding portion depositing burner 6 is changed.

Figure 2:
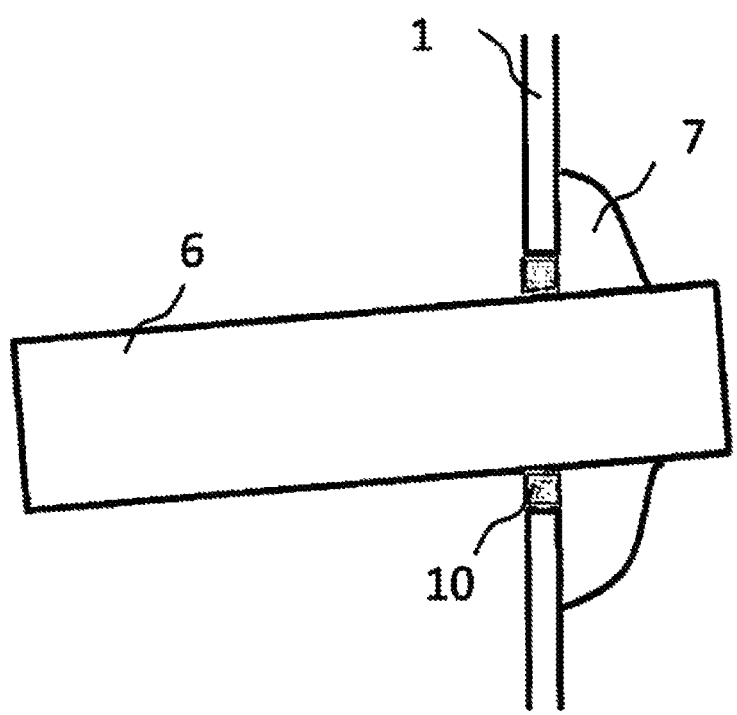
FIG. 2 shows an enlarged view of a sealing structure between a reaction chamber 1 and a surface-side clad-corresponding portion depositing burner 6.

FIG. 2 shows an enlarged view of a sealing structure provided between the surface-side clad-corresponding portion depositing burner 6 and the reaction chamber 1 in the apparatus for manufacturing a porous glass soot body shown in FIG. 1. This sealing structure includes a sealing cover 7 and a heat-blocking element 10.

The sealing cover 7 is provided to cover the opening in the reaction chamber 1, through which the surface-side clad-corresponding portion depositing burner 6 is inserted, from the outside of the reaction chamber 1. The sealing cover 7 has a generally domical and cylindrical shape, and its end on the larger-diameter side surrounds the surface-side clad-corresponding portion depositing burner 6 and firmly adheres onto the outer surface of the reaction chamber 1. The end on the shorter-diameter side firmly adheres onto the outer peripheral surface of the surface-side clad-corresponding portion depositing burner 6. In this manner, the sealing cover 7 provides airtight sealing of the opening in the reaction chamber 1.

The sealing cover 7 may be formed of a material having high-temperature resistance and flexibility, such as silicone rubber. This maintains the airtightness of the reaction chamber 1, by virtue of deformation of the sealing cover 7, even when the position of the surface-side clad-corresponding portion depositing burner 6 is changed relative to the reaction chamber 1 due to a change in the tilt as will be described later. Thus, the interior of the reaction chamber 1 is disconnected from the external atmosphere of the reaction chamber 1.

The heat-blocking element 10 is provided to fill the gap between the surface-side clad-corresponding portion depositing burner 6 and the opening in the reaction chamber 1, to block thermal radiation from the inside to the outside of the reaction chamber 1. This can prevent overheating of the burner holder 11 and the electric goniometer stage 12.

In addition, the heat-blocking element 10 is interposed between the outer peripheral surface of the surface-side clad-corresponding portion depositing burner 6 and the inner edge surface of the opening in the reaction chamber 1, to prevent direct contact between the surface-side clad-corresponding portion depositing burner 6 and the reaction chamber 1. This prevents direct interaction of thermal stress or the like between the surface-side clad-corresponding portion depositing burner 6 and the reaction chamber 1.

The heat-blocking element 10 has high heat-resisting and heat-blocking properties, and may be formed of a fibriform material that easily deforms in response to an externally applied force. This maintains the heat-blocking property, by virtue of its deformation in accordance with the change in the gap between the surface-side clad-corresponding portion depositing burner 6 and the reaction chamber 1, even when the position of the surface-side clad-corresponding portion depositing burner 6 changes relative to the reaction chamber 1 such as due to a change in the tilt thereof. It also serves to absorb the interacting stress to prevent the application of excessive stress to the surface-side clad-corresponding portion depositing burner 6 and the reaction chamber 1.

A preferred example of the fibriform material used as the heat-blocking element 10 can be quartz wool, which has excellent heat-resisting and heat-blocking properties. However, the fibriform material is not limited thereto, and may be carbon fibers, for example. If carbon fibers are used as the heat-blocking element 10, it is preferable to diffuse inert gas in the surrounding space for avoiding oxidant atmosphere.

In consideration of the heat-blocking effect, the filling density of quartz wool used as the heat-blocking element 10 is preferably 50 kg/m$^3$ or more. In addition, the thickness (in the axial direction of the surface-side clad-corresponding portion depositing burner 6) of the heat-blocking element 10 after filling the opening in the reaction chamber 1 is preferably 5 mm or more. If the thickness of the heat-blocking element 10 is less than 5 mm, the heat-blocking effect between the inside and outside of the reaction chamber 1 is insufficient.

On the other hand, increasing the thickness of the heat-blocking element 10 to be significantly larger than the thickness of the reaction chamber 1 does not significantly enhance the heat-blocking effect. In addition, it is not preferable that the thickness of the heat-blocking element 10 is larger than the thickness of the reaction chamber by 10 mm or more so that the heat-blocking element 10 protrudes into the reaction chamber 1, causing it to contact the burner and/or disturb the airflow. Further, if the filling density of the heat-blocking element is too high, excessive stress is applied to the surface-side clad-corresponding portion depositing burner 6, so that the angle cannot be changed smoothly. For these reasons, the filling density of quartz wool used as the heat-blocking element 10 is preferably 200 kg/m$^3$ or less.

If a chlorine-containing material such as silicon tetrachloride is used in the glass raw material gas to be fed to each burner, the interior atmosphere of the reaction chamber 1 tends to be hydrogen chloride-containing. On the other hand, transition metals in particular, such as iron, cobalt, chromium, copper, manganese, nickel, and vanadium, easily react with hydrogen chloride to produce a chloride. This kind of chloride may volatilize in a high temperature and be absorbed into the porous glass, lowering the quality of the porous glass soot body 9.

Therefore, in the case of using quartz wool, it is preferable to reduce the content of metal impurities such as iron, and more specifically, the content is preferably 1 ppm or less. The content of metal impurities is further preferably 0.2 ppm or less. Synthesized quartz may be used as a raw material of the quartz wool.

In the manufacture of the porous glass soot body 9 using the manufacturing apparatus shown in FIG. 1, some of the glass particles synthesized by using the core-side clad-corresponding portion depositing burner 5 may adhere to the porous glass soot body 9 to form a low density portion at the outer side of the flame of the core-side clad-corresponding portion depositing burner 5. When the shaft 2 is pulled up, the low density portion of the porous glass soot body 9 formed by using the core-side clad-corresponding portion depositing burner 5 is moved upward in the drawing, and then heated by the flame of the surface-side clad-corresponding portion depositing burner 6 to have an increased density. However, as the density of the part of the porous glass soot body 9 increases, cracks may occur in the porous glass soot body 9.

Such a crack in the porous glass soot body 9 usually occurs during the initial stage of the deposition of glass particles onto the seed rod 3, and is referred to as an initial crack. If an initial crack occurs, the process of manufacturing the porous glass soot body 9 needs to be restarted from the beginning, which lowers the yield and productivity of the optical fiber preform.

Even if the process of manufacturing the porous glass soot body 9 proceeds without initial cracks, the outer diameter of the porous glass soot body 9 may be unstable during the initial stage of the manufacturing process. If there is variation in the outer diameter of the porous glass soot body 9, the porous glass soot body 9 has an unstable proportion of the core-corresponding portion and the clad-corresponding portion and cannot be used for an optical fiber preform. For this reason, it takes time to become able to continuously manufacture the porous glass soot body 9 with a stable, targeted outer diameter, which lowers the productivity of the porous glass soot body 9.

However, by changing the tilt of the surface-side clad-corresponding portion depositing burner 6 during the initial stage of the formation of the porous glass soot body 9 to appropriately maintain the temperature distribution of the porous glass soot body 9, the thermal stress in the porous glass soot body 9 can be relieved, so that the occurrence of the initial crack and outer diameter variation in the porous glass soot body 9 can be reduced.

Therefore, a portion of the porous glass soot body 9 having a cylindrical shape and a substantially constant outer diameter, which is referred to as a steady portion of the porous glass soot body 9, is used for an optical fiber preform for manufacturing optical fibers. Thus, the arrangement of each burner is predetermined to optimize the heating condition for forming the steady portion. However, during the initial stage of the deposition of glass particles in manufacturing the porous glass soot body 9, the outer diameter of the porous glass soot body 9 gradually increases along its longitudinal direction. Thus, the conditions of the burners for heating the surface of the porous glass soot body 9 changes with time, which leads to the occurrence of the initial crack and outer diameter variation.

To address this, the tilt of the surface-side clad-corresponding portion depositing burner 6 is set downward relative to a tilt that is predetermined for forming the steady portion at the beginning of the deposition of glass particles, and is gradually changed toward the tilt predetermined for forming the steady portion until the steady portion begins to form, and the steady portion is formed at the predetermined tilt. In this manner, the condition of the surface-side clad-corresponding portion depositing burner 6 for heating the porous glass soot body 9 can be maintained appropriate at any longitudinal position of the porous glass soot body 9. The porous glass soot body 9 thus manufactured has a stable outer diameter without cracks, and can be formed into a high-quality optical fiber preform after subjected to the dehydration and transparentization in a heating furnace in the later process.

[Example Manufacturing Method]

The apparatus shown in FIG. 1 was used to manufacture the porous glass soot body 9 to be formed into an optical fiber preform. The gap between the surface-side clad-corresponding portion depositing burner 6 and the opening in the reaction chamber 1 through which to insert it was filled with the heat-blocking element 10 formed of Quartz wool (manufactured by Shin-Etsu Quartz Products Co., Ltd.). The thickness of the reaction chamber 1 at the opening was 6 mm, while the heat-blocking element 10 filling it was 7 mm thick.

The surface-side clad-corresponding portion depositing burner 6 was then set at an angle of 10 degrees downward relative to the horizontal. The glass raw material gas was fed into the oxyhydrogen flame of each of the core-side clad-corresponding portion depositing burner 5 and the surface-side clad-corresponding portion depositing burner 6 to produce glass particles, which then began to be deposited onto the seed rod 3.

As the deposition of the core-corresponding portion grew, the seed rod 3 was pulled up while being rotated. From the time when the seed rod 3 was pulled up by 100 mm, the angle of the surface-side clad-corresponding portion depositing burner 6 was gradually changed upward relative to the horizontal plane. When the pull-up distance reached 200 mm, the angle of the surface-side clad-corresponding portion depositing burner 6 reached a predetermined angle of 5 degrees upward relative to the horizontal plane. This predetermined angle of 5 degrees was determined as the tilt angle of the surface-side clad-corresponding portion depositing burner 6 in the steady state of the surface-side clad-corresponding portion depositing burner 6, that is, the tilt angle for forming the steady portion of the porous glass soot body 9 having a stable outer diameter. Thereafter this tilt was maintained throughout the formation of the porous glass soot body 9. The porous glass soot body 9 was thus formed with a length of 1400 mm and an outer diameter of 250 mm at its straight body part.

Fifty porous glass soot bodies 9 were manufactured under the above-mentioned conditions, and no initial crack occurred in the porous glass soot bodies 9 as a result of changing the angle of the surface-side clad-corresponding portion depositing burner 6. Also, there was no such variation in the outer diameter that affects the characteristics of the final optical fibers.

In addition, as a result of filling the gap between the reaction chamber 1 and the surface-side clad-corresponding portion depositing burner 6 with the heat-blocking element 10 of a fibriform material, it was able to smoothly change the angle of the surface-side clad-corresponding portion depositing burner 6 from 10 degrees downward to 5 degrees upward. Further, since the surface-side clad-corresponding portion depositing burner 6 did not directly contact the opening in the reaction chamber 1 in the course of changing the angle of the surface-side clad-corresponding portion depositing burner 6, there was no excessive stress applied to the burner and no damage to the burner observed. Also, the heat-blocking element 10 effectively blocked the heat generated in the reaction chamber 1, so that no overheating of the burner holder 11 and the electric goniometer stage 12 was occurred.

As described above, filling the gap between the opening provided for inserting the burner into the reaction chamber 1 and the burner inserted through the opening with the heat-blocking element 10 can block the thermal radiation from the inside to the outside of the reaction chamber 1. This can prevent damage to the burner due to thermal stress, and can also prevent the overheating of the burner holder 11, the electric goniometer stage 12 and the like, arranged outside the reaction chamber 1.

The heat-blocking element 10 also serves as a cushion to prevent the direct contact between the wall of the reaction chamber 1 and the burner, preventing damage to the burner due to their impact. This allows the tilt of the burner to be changed, and also enables maintaining the heat-blocking property even when the tilt of the burner is changed. Thus, the tilt of the burner can be easily changed using the electric goniometer stage 12.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An apparatus for manufacturing a porous glass soot body to be formed into an optical fiber preform, the apparatus comprising:
   a reaction chamber;
   a burner to form the porous glass soot body by depositing glass particles onto a seed rod hung inside the reaction chamber; and
   a sealing structure including a heat-blocking element and a sealing cover, wherein the heat-blocking element comprises a quartz wool material and fills a gap between the burner and an opening for inserting the burner into the reaction chamber, to block heat between the inside and outside of the reaction chamber, and the sealing cover covers the opening and adheres to an outside surface of the reaction chamber, to provide airtight sealing of the opening.

2. The apparatus for manufacturing a porous glass soot body according to claim 1, wherein the heat-blocking element deforms in accordance with displacement of the burner in the opening.

3. The apparatus for manufacturing a porous glass soot body according to claim 1, wherein the quartz wool material contains 1 ppm or less of transition metal impurities.

4. The apparatus for manufacturing a porous glass soot body according to claim 1, wherein the heat-blocking element has a thickness of 5 mm or more.

5. The apparatus for manufacturing a porous glass soot body according to claim 1, wherein the burner comprises:
   a core-corresponding portion depositing burner to form a core-corresponding portion corresponding to an optical fiber core; and
   a clad-corresponding portion depositing burner to form at least a part of a clad-corresponding portion corresponding to an optical fiber clad.

6. The apparatus for manufacturing a porous glass soot body according to claim 5, wherein the clad-corresponding portion depositing burner comprises:
   a core-corresponding portion-side clad-corresponding portion depositing burner to form a part of the clad-corresponding portion by depositing glass particles onto the core-corresponding portion formed by using the core-corresponding portion depositing burner; and
   a surface-side clad-corresponding portion depositing burner to form another part of the clad-corresponding portion by depositing glass particles onto the part of the clad-corresponding portion formed by using the core-corresponding portion-side clad-corresponding portion depositing burner.

7. The apparatus for manufacturing a porous glass soot body according to claim 6, wherein the surface-side clad-corresponding portion depositing burner is set at a predetermined tilt to form a steady portion of the clad-corresponding portion having a steady diameter, and is set downward relative to the predetermined tilt to start to form the clad-corresponding portion and is changed to the predetermined tilt before starting to form the steady portion.

8. The apparatus for manufacturing a porous glass soot body according to claim 7, wherein the surface-side clad-corresponding portion depositing burner is set at a tilt forming an angle of 10 degrees downward relative to a horizontal plane to start to form the clad-corresponding portion, and is set at a tilt forming an angle of 5 degrees upward relative to the horizontal plane to form the steady portion of the clad-corresponding portion.

9. The apparatus for manufacturing a porous glass soot body according to claim 7, further comprising an electric goniometer stage for changing the tilt of the surface-side clad-corresponding portion depositing burner.

10. The apparatus for manufacturing a porous glass soot body according to claim 1, further comprising a goniometer disposed adjacent the rear of the burner, outside the reaction chamber, such that the heat-blocking element blocks heat from the reaction chamber reaching the goniometer.

* * * * *